July 29, 1930.          C. A. BORNMANN          1,771,523
TURNTABLE FOR TRIPODS AND THE LIKE
Filed Feb. 18, 1927
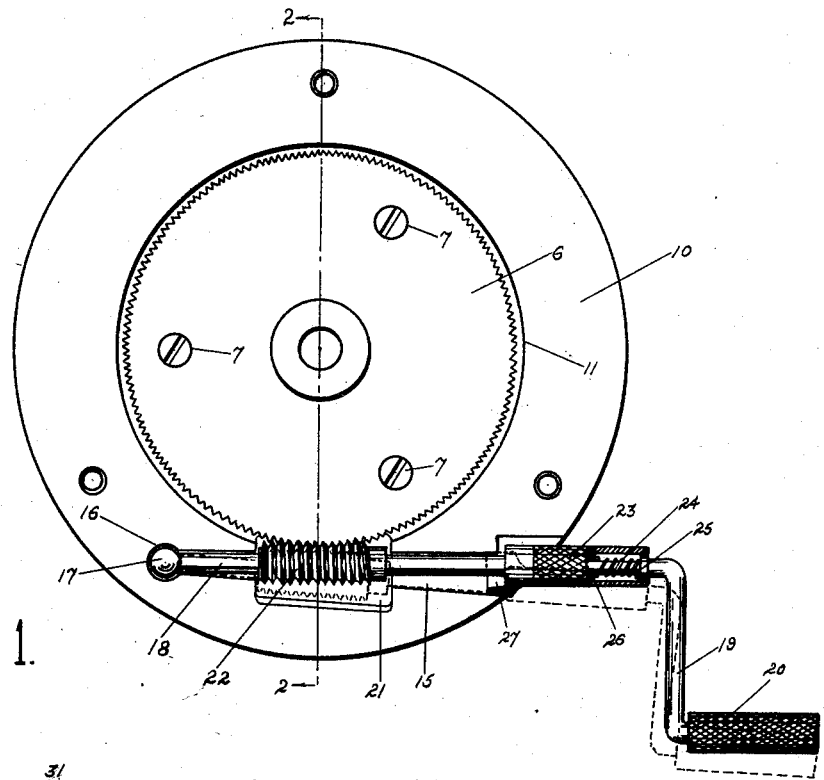
Fig. 1.
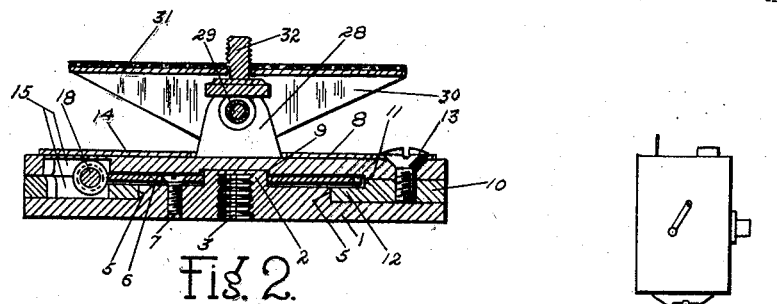
Fig. 2.
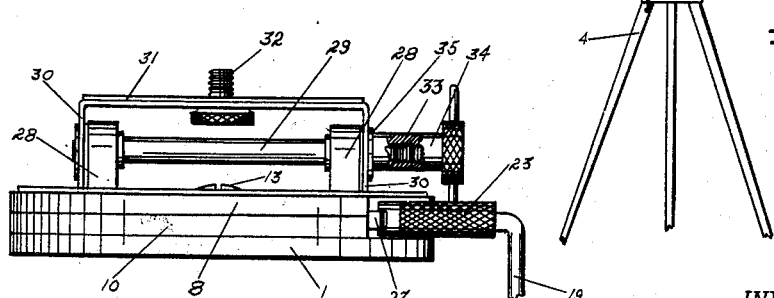
Fig. 3.
Fig. 4.
INVENTOR
CARL A. BORNMANN
BY
ATTORNEY Patented July 29, 1930

1,771,523

UNITED STATES PATENT OFFICE

CARL A. BORNMANN, OF BINGHAMTON, NEW YORK, ASSIGNOR, BY MESNE ASSIGNMENTS, TO AGFA ANSCO CORPORATION, OF BINGHAMTON, NEW YORK, A CORPORATION OF NEW YORK

TURNTABLE FOR TRIPODS AND THE LIKE

Application filed February 18, 1927. Serial No. 169,386.

My invention pertains especially to turn tables for tripods and the like, but it will be understood that the same may be used to advantage in various arts and on various appliances wherein it is desired to rotatably support certain mechanisms.

The primary object of my invention is to provide a turn table which may be quickly and easily rotated to the estimated or rough position of adjustment, and which may then, by a simple manipulation of one of its parts, be turned in either direction to a very fine adjustment, in which position it will be automatically held against accidental movement, or from which position it may be readily adjusted in either direction.

Another object is the provision of a gear driving means for such a turn table, provided with means for quickly placing the adjusting gears in or out of mesh with each other as desired.

A still further object lies in the construction and arrangement of parts, whereby the device is simple of operation and readily assembled, and which is small and compact and of few parts.

Other objects and advantages in details of construction and operation will be apparent as the description proceeds, reference now being had to the figures of the drawing wherein like reference numerals indicate like parts.

In the drawing:—

Figure 1 is a top plan view of my improved turn table with the top plate and instrument supporting member removed for clearness of illustration.

Figure 2 is a detail cross sectional view taken on the line 2—2 of Figure 1, and illustrating the device completely assembled.

Figure 3 is a side view of the assembled turn table, certain parts being broken away for clearness of illustration.

Figure 4 is a detail diagrammatic view illustrating one use of my invention.

The reference numeral 1 refers to the supporting plate provided centrally with a boss 2, which is in turn provided with a threaded recess 3 adapted to receive the attaching screw (not shown) of a tripod 4 or other suitable device. The supporting plate 1 is shouldered as at 5 and secured to the top surface of this shouldered portion 5 is a gear 6, fastened thereto as by the screws 7. The gear 6 is apertured centrally to receive the upper end of the boss 2 passing therethrough and lying slightly above the upper surface of the gear 6. The toothed periphery of the gear 6 extends beyond and overlies the shouldered portions 5 of the base plate 1.

Overlying the gear 6 is a top plate 8 recessed on its under side as at 9 to receive the upper slightly protruding face of the boss 2, whereby to space the top plate 8 from the gear 6 and to permit rotation of said top plate with respect thereto. Between the top plate 8 and the supporting plate 1 is a spacer plate 10, shouldered as at 11 adjacent the toothed periphery of the gear 6 and provided with the inner reduced extension 12 underlying the gear 6 and having bearing against the shoulders 5 of the supporting plate 1. This spacer plate 10 is secured as by screws 13 to the top plate 8, being thereby rotatable therewith. A cover plate 14 which may carry advertising matter or other indicia is secured to the upper surface of the top plate 8 as by the same screws 13.

Top plate 8 and the spacer plate 10 are recessed at one point as at 15, the inner edge of the recess being spherical in shape as at 16 to receive the ball end 17 of the shaft 18. The recess 15 tapers outwardly from the inner end 16 so that the end of the recess opening out through the periphery of the plates 8 and 10 is relatively wide. This tapered recess permits a lateral movement of the shaft 18, said shaft extending beyond the open end of the recess and bent at its free end to form a crank 19 provided with the knurled handle 20, whereby said shaft 18 may be rotated within the recess.

At the point in the recess 15 where the shaft 18 passes the toothed periphery of the gear 6, substantially tangential thereto, the recess is widened as at 21. This widened portion of the recess opens to the toothed periphery of the gear 6 on one side to permit the worm gear 22 carried by the shaft 18 at this point, to engage with the teeth of the gear 6. The enlargement 21 of the recess likewise extends outwardly away from the gear 6 whereby when the shaft 18 is moved laterally within the tapered recess 15, the worm gear 22 will move out of engagement with the gear 6. Such position of the shaft and gear is shown in dotted lines in Figure 1.

In order that the shaft 18 may be held or locked in either of its two adjusted positions, as above described, the following mechanism is provided.

Slidably mounted on the shaft 18, between the crank portion 19 thereof and the relatively wide open end of the tapered recess 15, is a hollow sleeve 23. Within the sleeve 23 and encircling the shaft 18 is a small coil spring 24 having one end thereof secured to or abutting against the enlargement 25 on the shaft 18 and having its opposite end bearing against a plug 26 carried within the hollow sleeve 23 and through which the shaft 18 passes.

The inner end of the sleeve 23 carries a laterally projecting wedged shaped dog 27 adapted to be received within and to wedge against either of the tapered side walls of the recess 15.

With reference to Figure 1, it will be understood that with the parts in the position shown in full lines, if now the operator grasps the sleeve 23 and holds the same outwardly on the shaft 18 against the tension of the spring 24, and turns said sleeve a half turn to bring the wedge shaped dog 27 on the side opposite that in which it is shown in Figure 1, the shaft 18 may be moved laterally to disengage the worm gear 22 from the teeth of the gear 6 and upon release of the sleeve 23, the wedge 27 will move inwardly and engage against the opposite side wall of the tapered recess 15, thereby locking the gear 22 out of engagement with the gear 6. In such position, of course, it will be observed that the top plate 8 may be freely rotated by hand and quickly set to any desired position with respect to the stationary base plate 1 and gear 6. After this free or quick adjustment has been made and it is desired to secure the rotatable top plate 8 in its adjusted position, the operator again moves the sleeve 23 outwardly on the shaft 18, disengaging the dog 27 from within the tapered recess 15, moves the shaft 18 laterally to the position wherein the worm gear 22 will engage with the teeth of the gear 6, then rotating the sleeve 23 until the dog 27 lies on the opposite side of the tapered recess 15, whereupon inward movement of the sleeve 23 will lock the shaft in such position with the gears 22 and 6 meshing with each other. In such position, it will be observed that there is little danger of accidental movement on the part of the top plate 8, due to the engagement of the teeth of the gear 6 with the worm gear 22. If however, in this position, further and fine adjustment of the turn table top 8 is desired, it is only necessary for the operator to rotate the shaft 18 by means of the crank 20, resulting in the teeth of the worm gear 22 following around the teeth of the stationary gear 6 and thereby rotating the top plate 8 by virtue of the ball and socket connection 16 and 17 between the shaft 18 and said top plate.

Mounted on the top plate 8 for rotation therewith, are the standards 28 in which is mounted a pintle or pivot pin 29 providing a pivot or bearing surface for the downwardly extending flanges 30 of a rockable platform 31, provided centrally with a screw 32 to which may be secured camera or other instrument desired to be rotatably mounted upon the tripod 4 and adjusted either rotatably or rockably by means of my improved turn table. The pintle 29 extends beyond one of the supports 28 and is threaded as at 33 to receive a clamping sleeve 34 provided with a flange 35 adapted to clamp tightly against one of the side flanges 30 of the rockable support 31, whereby the same may be locked in adjusted position.

Of course, many changes may be made in details of construction and operation without departing from the spirit and scope of my invention. I do not limit myself, therefore, to the exact form shown other than by the appended claims.

I claim:—

1. A turn table comprising a fixed support, a gear secured thereto, a rotatable plate journalled on said support and enclosing said gear, said plate having a tapered recess, a rotatable shaft pivotally journalled in said plate and adapted for lateral movement in said recess toward and away from said gear, a worm gear on said shaft adapted to engage said first named gear in one position, and means on said shaft for locking said shaft in either of its adjusted positions.

2. A turn table comprising a fixed support, a gear secured thereto, a rotatable plate journalled on said support, a shaft journalled in said plate and carrying a gear adapted for engagement or disengagement with said fixed gear, said plate having a tapered recess within which said shaft is laterally movable, and means for locking said shaft gear in either of its adjusted positions comprising a locking sleeve on said shaft cooperating with said recess.

3. A turn table comprising a fixed support, a gear secured thereto, a rotatable plate journalled on said support, a shaft journalled in said plate and carrying a gear adapted for engagement or disengagement with said fixed gear, said plate having a tapered recess within which said shaft is laterally movable, and means for locking said shaft gear in either of its adjusted positions comprising a locking sleeve on said shaft cooperating with said recess, said sleeve provided with a wedge for engaging either tapered side wall of said recess.

4. A turn table comprising a fixed part and a rotatable part, a shaft provided with means adjustable into or out of engagement with said fixed part, a sleeve on said shaft, and means on said sleeve for locking said shaft in either of its adjusted positions, said sleeve being slidable and rotatable on said shaft, means normally urging said sleeve longitudinally into locking position, and a wedge carried by said sleeve for cooperation with said movable part.

CARL A. BORNMANN.